(12) United States Patent
Jayakumar et al.

(10) Patent No.: US 10,474,596 B2
(45) Date of Patent: Nov. 12, 2019

(54) PROVIDING DEDICATED RESOURCES FOR A SYSTEM MANAGEMENT MODE OF A PROCESSOR

(71) Applicant: Intel Corporation, Santa Clara, CA (US)

(72) Inventors: Sarathy Jayakumar, Portland, OR (US); Ashok Raj, Portland, OR (US); John G. Holm, Beaverton, OR (US); Narayan Ranganathan, Portland, OR (US); Mohan J. Kumar, Aloha, OR (US); Sergiu D. Ghetie, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 14/749,893

(22) Filed: Jun. 25, 2015

(65) Prior Publication Data

US 2016/0378697 A1    Dec. 29, 2016

(51) Int. Cl.
*G06F 13/24* (2006.01)
*G06F 1/3287* (2019.01)
*G06F 9/4401* (2018.01)
*G06F 1/3228* (2019.01)

(52) U.S. Cl.
CPC .......... *G06F 13/24* (2013.01); *G06F 1/3228* (2013.01); *G06F 1/3287* (2013.01); *G06F 9/4405* (2013.01); *G06F 9/4406* (2013.01); *Y02D 10/171* (2018.01)

(58) Field of Classification Search
CPC ... G06F 13/24; G06F 9/44; G06F 1/32; G06F 9/4812
See application file for complete search history.

(56) References Cited

U.S. PATENT DOCUMENTS

| | | | | |
|---|---|---|---|---|
| 7,130,951 B1 * | 10/2006 | Christie | ............... | G06F 9/4812 710/261 |
| 7,363,411 B2 * | 4/2008 | Kobayashi | ............ | G06F 9/5016 710/261 |
| 7,366,888 B2 * | 4/2008 | Dayan | .................. | G06F 9/4406 713/2 |
| 7,404,105 B2 * | 7/2008 | Arai | ...................... | G06F 11/203 714/10 |
| 7,546,487 B2 * | 6/2009 | Marisetty | ............ | G06F 11/0793 714/10 |
| 8,151,027 B2 * | 4/2012 | Zimmer | ................ | G06F 9/4812 710/261 |

(Continued)

OTHER PUBLICATIONS

U.S. Appl. No. 14/737,768, filed Jun. 12, 2015, entitled, "Providing Autonomous Self-Testing of a Processor," by Vedvyas Shanbhogue, et al.

*Primary Examiner* — Henry Tsai
*Assistant Examiner* — Christopher A Daley
(74) *Attorney, Agent, or Firm* — Trop, Pruner & Hu, P.C.

(57) ABSTRACT

In one embodiment, a processor includes a plurality of cores including a first core to be reserved for execution in a protected domain, the first core to be hidden from an operating system. The processor may further include a filter coupled to the plurality of cores, where the filter includes a plurality of fields each associated with one of the plurality of cores to indicate whether an interrupt of the protected domain is to be directed to the corresponding core. Other embodiments are described and claimed.

23 Claims, 10 Drawing Sheets

(56) References Cited

U.S. PATENT DOCUMENTS

| | | | |
|---|---|---|---|
| 8,539,245 B2 | 9/2013 | Swanson et al. | |
| 8,560,823 B1* | 10/2013 | Aytek | G06F 8/654 |
| | | | 713/2 |
| 9,465,432 B2* | 10/2016 | Henry | G06F 1/04 |
| 2004/0103299 A1* | 5/2004 | Zimmer | G06F 21/57 |
| | | | 726/26 |
| 2007/0061634 A1* | 3/2007 | Marisetty | G06F 11/0706 |
| | | | 714/48 |
| 2007/0113088 A1* | 5/2007 | Volp | G06F 9/4405 |
| | | | 713/169 |
| 2007/0204085 A1* | 8/2007 | Orlando | G06F 21/74 |
| | | | 710/261 |
| 2008/0114916 A1* | 5/2008 | Hummel | G06F 12/1081 |
| | | | 710/266 |
| 2010/0262743 A1* | 10/2010 | Zimmer | G06F 9/4812 |
| | | | 710/267 |
| 2012/0297177 A1* | 11/2012 | Ghosh | G06F 21/53 |
| | | | 713/2 |
| 2013/0067132 A1* | 3/2013 | Guddeti | G06F 13/24 |
| | | | 710/260 |
| 2015/0143089 A1* | 5/2015 | Lewis | G06F 9/4812 |
| | | | 712/244 |
| 2015/0356299 A1* | 12/2015 | Barkelew | G06F 21/575 |
| | | | 713/2 |
| 2016/0070932 A1* | 3/2016 | Zimmer | G06F 21/72 |
| | | | 713/192 |
| 2016/0357657 A1* | 12/2016 | Zhang | G06F 11/362 |

* cited by examiner

PROVIDING DEDICATED RESOURCES FOR A SYSTEM MANAGEMENT MODE OF A PROCESSOR

TECHNICAL FIELD

Embodiments relate to processors and protected odes of such processors.

BACKGROUND

In many server systems, a protected processor mode known as system management mode (SMM) is extensively used by firmware for error handling and for various reliability availability and serviceability (RAS) events in server systems, among other legacy events that trigger an interrupt (a system management interrupt (SMI)) to this mode. In today's high core count server systems, overreliance on SMIs leads to innumerable complex corner cases and race conditions that cause convoluted workarounds, and increases to the complexity of a processor.

Another downside of SMI-based RAS is the need to time-slice SMIs for complex RAS features, leading to arduous debug tasks and customer dissatisfaction. Apart from such architectural and engineering challenges, the current model also adversely affects runtime operating system (OS) performance, as entry into SMM stalls the OS from forward progress.

DETAILED DESCRIPTION

Figure 1:
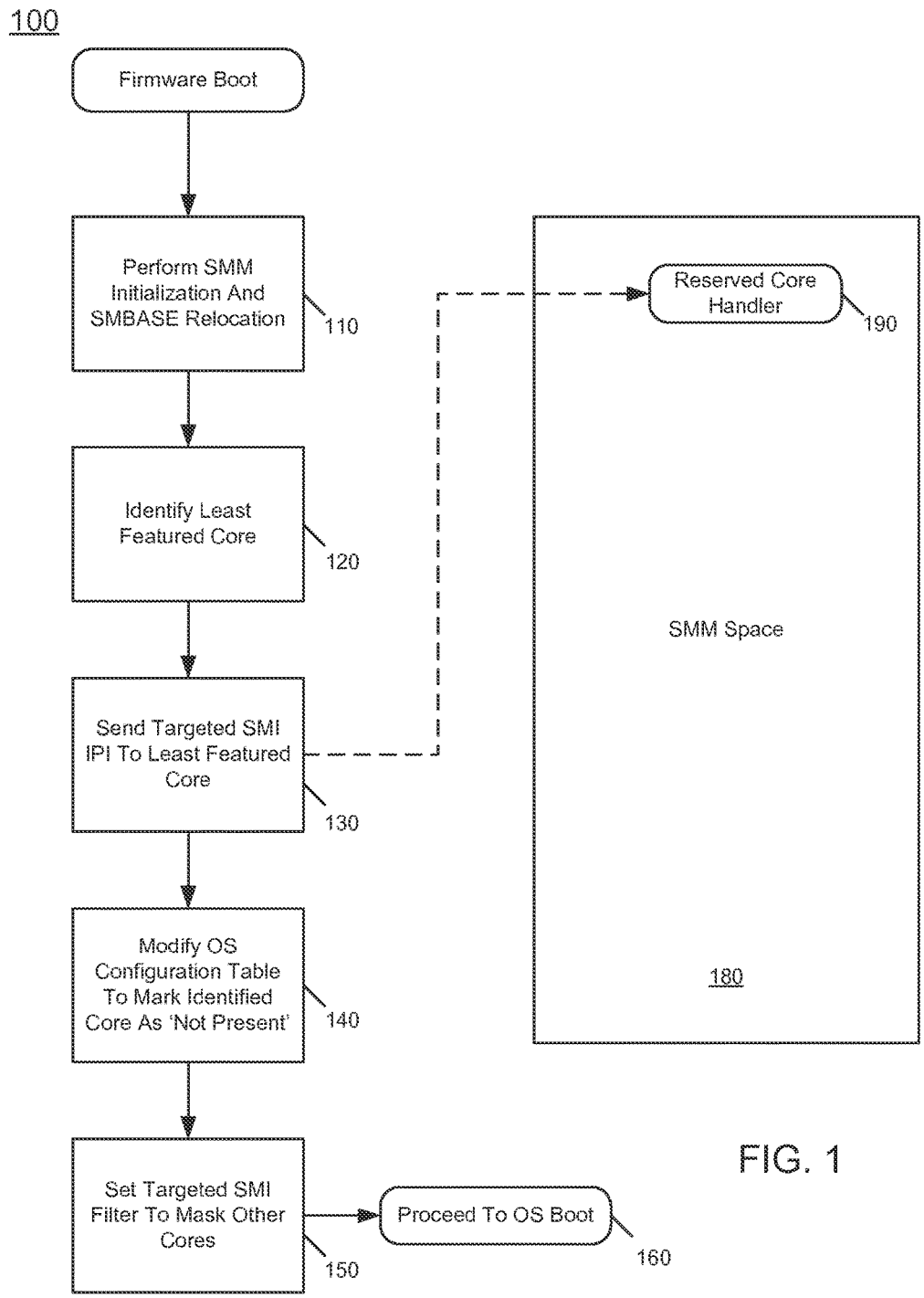
FIG. 1 is a flow diagram of a method in accordance with an embodiment of the present invention.

In various embodiments, a multicore processor or other system on chip (SoC) may be provided with a system management service processor, which may be an engine dedicated or reserved for operation in SMM. In different implementations, any core/engine in a cache coherent domain, such a large or small core of a heterogeneous processor that is concealed from the OS, can be used as the system management service processor.

By providing a reserved core, core downtime may be minimized due to SMM entry and exit events. Embodiments may configure this reserved core to be a single core to be maintained inside the SMM domain for the life of the boot. In embodiments, this reserved core may be realized by advertising one less core to the operating system and retaining this unadvertised core in the SMM domain as a system management service processor.

In an embodiment, after this designation, the concealed core resides in the SMM domain and is advertised in one or more OS configuration tables as "Not Present," so that this core remains concealed from the OS. In an embodiment, the SMM domain is protected by particular memory range registers (e.g., system management memory range registers SMRR and SMMR2), so there is no impact to runtime RAS/SMM handling from a security perspective. In an embodiment, a SMI handler is executed when the processor enters SMM, and resides in a protected area of memory called SMRAM. This area is protected from accesses; both in-bound accesses and by the cores that are outside of SMM. The system firmware sets up a SMBASE relocation, so that each logical processor has a unique SMBASE within the SMRAM.

In contrast to conventional SMM mechanisms, embodiments avoid stealing cycles from OS runtime on all logical processors (which causes all logical processors to enter into the SMM domain for a period of time), leading to OS stalls and performance degradation. Because the OS stalls and no interrupts are processed for this duration, the logical processors are all released back from the SMM domain to the OS domain within a given time interval, leading to time-slicing requirements, arduous debug tasks and so forth, if an embodiment is not used.

Although the scope of the present invention is not limited in this regard, example interrupts may be received from a variety of sources, including legacy SMIs (e.g., from a south bridge such as general purpose input/output (GPIO) events, TCO timer event(s) and software SMIs via an I/O port); uncore SMI sources, including error events (correctable and uncorrectable) from a memory subsystem, integrated input/output/Peripheral Component Interface Express (PCIe) subsystem, and/or interconnect subsystem; and software recoverable action required (SRAR) events; and software recoverable action optional (SRAO)) events, etc. All such events may be handled by the concealed core, and augmented by concurrent signaling of errors to remove a variety of corner cases.

In an embodiment system firmware (e.g., BIOS), while booting, identifies a core on a processor socket to be the reserved core. The system firmware performs a SMBASE relocation on all logical processors, but sequesters only the reserved core, which is then alone placed in the SMM domain. This reserved core can handle platform events that are traditionally handled via SMM. In an embodiment, the firmware may set a directed SMI map to prevent all other cores (except the reserved core) from being a target of a broadcast SMI.

In the simplest implementation, this reserved core polls status registers across various subsystems of a processor and handles them accordingly, without affecting operation of the other cores that are in the OS domain. In general, the reserved core handler may operate by cycling through SMI status registers in the platform (e.g., including PCH and uncore) and handling them accordingly.

In certain embodiments, to conserve power, the reserved core can be placed in a low power state when inactive, as described below. On a system event, the reserved core may be woken to execute the next instruction. Event notification to the reserved core may occur. That is, the reserved core may be notified on a system event that would normally be sent by a broadcast SMI. Since the reserved core is already in SMM, a new SMI event cannot be delivered to this core. In one embodiment, a wake event may be sent to the reserved core using a MONITOR/MWAIT technique. To send this event notification, microcode writes to a MONITOR location that the reserved core has setup for the MWAIT to monitor. To this end, microcode may expose a SMM monitor address MSR that can be written only from within SMM. The reserved core primes this MSR with the address of the monitor location. If there are no events to service, the reserved core enters into an MWAIT state.

Referring now to FIG. 1, shown is a flow diagram of a method in accordance with an embodiment of the present invention. As shown in FIG. 1, method 100 may be performed by combinations of hardware, software, and/or firmware. As an example, in one embodiment method 100 may be performed by processor hardware during pre-boot execution of firmware such as during a boot phase of a basic input/output system (BIOS). Method 100 begins by performing SMM initialization and SMMBASE relocation (block 110). By way of these operations, a reserved portion of a system memory may be secured and allowed to be accessed only when a processor is in SMM. This SMMBASE may be within an SRAM 180, which in an embodiment may be a reserved portion of a system memory such as a DRAM. In an embodiment, the SMMBASE based may correspond to a top of this SMM space 180.

Next, control passes to block 120 where a least featured core may be identified. In a system having a heterogeneous processor, this least featured core may be a smallest and/or most basic core, such as an in-order core, where heterogeneous cores further include one or more larger out-of-order cores. In one particular embodiment, a least featured core may be an Intel® Minute core while other cores of the processor may be full-featured Intel® Architecture (IA) cores. In other cases, such as where a processor includes homogeneous cores, the least featured core may be a core that is in some way degraded as compared to the other cores, e.g., based on manufacturing testing results, configuration (as determined by configuration registers) or so forth. In any event, this least featured core is identified and at block 130 a targeted system management interrupt (SMI) inter-processor interrupt (IPI) is sent to this core. As seen, this IPI directed to this least featured core causes the core to enter into SMM, more specifically illustrated as a reserved core handler 190 within SMRAM 180, details of which will be discussed further below. Note that this action thus places the identified core into a SMM domain, where it is thus segregated and reserved as a system management service processor, at least for the current boot cycle (e.g., until a next reset). Understand also that while embodiments described herein use a single reserved core, in other embodiments multiple cores may be dedicated to the SMM domain.

Still with reference to FIG. 1, after this targeted SMI IPI signal is sent to the least featured core, control passes to block 140. There a given OS or other configuration table may be modified to mark this identified core as not present. In one embodiment, the OS table may be an Advanced Configuration and Power Interface (ACPI) table, such as a multiple advanced programmable interface control interrupt controller description table (MADT), which may be one of many OS configuration tables. As such, by modifying this OS table to mark this identified core as not present, the core will remain in a transparent or non-visible state with regard to the OS. That is, this reserved core remains hidden from the OS, such that the OS is not aware of the presence of this core, and activities taken by this core remain invisible to the OS.

Still with reference to FIG. 1, control next passes to block 150 where a directed SMI bit mask (or SMI filter) may be set to mask other cores. That is, this directed SMI bit mask may have an active mask value set for fields associated with all of the other cores of the processor, such that when a SMI or other signal initiating entry into a SMM is received, no other core will enter into SMM (as only the reserved core remains within this SMM domain). Thereafter, at block 160 control proceeds to an OS boot. Thus at the conclusion of a pre-boot BIOS execution, control is handed off to enable the OS to be loaded and launched. Understand while shown at this high level in the embodiment of FIG. 1, many variations and alternatives are possible.

Figure 2:
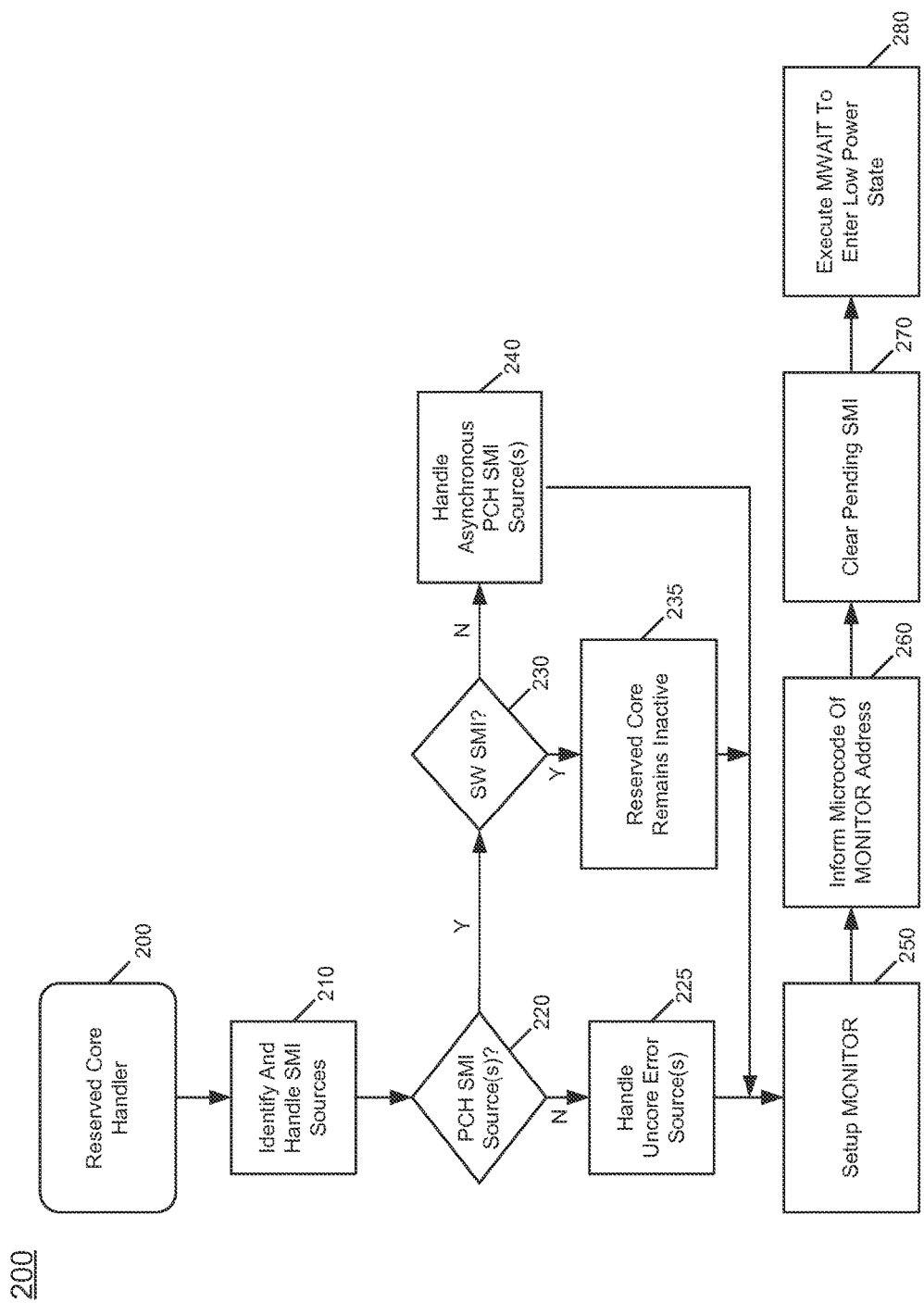
FIG. 2 is a flow diagram of a method for performing system management mode activities in accordance with an embodiment of the present invention.

Referring now to FIG. 2, shown is a flow diagram of a method for performing system management mode activities in accordance with an embodiment of the present invention. As shown in FIG. 2, method 200 may be executed within a processor by a reserved core handler of a SMM domain having a dedicated reserved core. Method 200 begins by identifying and handling one or more SMI sources (block 210). More specifically, the reserved core is configured to receive incoming SMIs, which may be received from a variety of different sources. Thus at diamond 220 it is determined whether the SMI source is from a peripheral controller. Note that this peripheral controller (PCH) may be an integrated controller within a multicore processor (and which may be integrated on a common semiconductor die with the remainder of the processor), or it may be an external peripheral controller in another implementation. Such peripheral controller provides SMI sources from a variety of different devices coupled to a processor. If it is determined that the SMI source is not from a peripheral controller, control passes to block 225 where one or more errors associated or other SMI triggering events associated with an uncore of the processor can be handled, e.g., by way of one or more handler routines within the reserved core handler to process such uncore errors.

Still with reference to FIG. 2, control passes from diamond 220 to diamond 230, if it is determined that the SMI source is from the PCH. At diamond 230 it is determined whether the SMI received is a software SMI. Typically, such software SMI may be generated by a core write to a particular I/O port that in turn generates a SMI event to enable ring-0 code to invoke runtime BIOS operation (such as an SMM handler). In this situation, if the SMI is determined to be a software SMI, control passes to block 235 where the reserved core remains inactive. That is, in this situation the core that issued the trigger for this software SMI (e.g., by the write to the particular I/O port) would have checked in and may be configured to handle the particular SMM operation. In one example use case, such software SMI may be used to enable this non-reserved core to pass parameters to the SMM domain, access to one or more protected resources (e.g., an MSR or other protected register) of the core. Of course in other cases, a software SMI may be triggered in other manners and may be handled by the reserved core or another appropriate logic that executes a given SMM handler.

As further illustrated in FIG. 2, if it is determined at diamond 230 that the SMI is not a software SMI, control next passes to block 240, where one or more asynchronous PCH SMI sources may be handled. Various SMM routines within the reserved core handler may be executed to handle these events associated with these asynchronous SMI sources.

Still with reference to FIG. 2, in some embodiments to improve power consumption and efficiency, the reserved core may be configured to be placed into a low power state when it is not handling system management mode events. In the particular embodiment shown in FIG. 2, this low power state may be implemented using MONITOR/MWAIT operations. Such operations generally are used to configure a monitor agent to monitor a particular location so that a remainder of the reserved core can be placed into a low power state, where it can remain until an update to the monitored location occurs.

Thus as further shown in FIG. 2, after handling any active SMI event, control passes to block 250 where a monitor may be set up, e.g., responsive to execution of a MONITOR instruction. This monitor may be to a given location such as identified in a SMM monitor address MSR, in an embodiment. In an embodiment, the monitored location itself may be present in SMRAM. Control next passes to block 260 where microcode may be informed of this monitor address. Thereafter, at block 270 the pending SMI may be cleared. At this point, the reserved core has handled all SMI sources and may be about to enter into an MWAIT state. Before that, the reserved core may ensure that it clears the 'Pending SMI' indication in a local advanced programmable interrupt controller, indicating that all SMI sources have been handled. This indication allows a new SMI triggered after this point to be delivered to the reserved core as a wake event. Still with reference to FIG. 2, from block 270, control passes to block 280, where an MWAIT instruction may be executed to enable the reserved core to enter into a low power state.

Note that the core may remain in a low power state until an updated value is written to the monitored location. Responsive to such update, the monitor may awaken the reserved core. This operation may occur, for example, responsive to an incoming interrupt, to enable the reserved core to be woken up to handle the SMI within the SMM domain. Understand while shown at this high level in the embodiment of FIG. 2, many variations and alternatives are possible. For example, in some cases, a core itself may include one or more logics to execute low power entry/exit operations, e.g., responsive to MONITOR/MWAIT instructions. Or the core may couple to a power controller such as a power control unit of an uncore of the processor, which may perform control of low power modes of operation.

Figure 3:
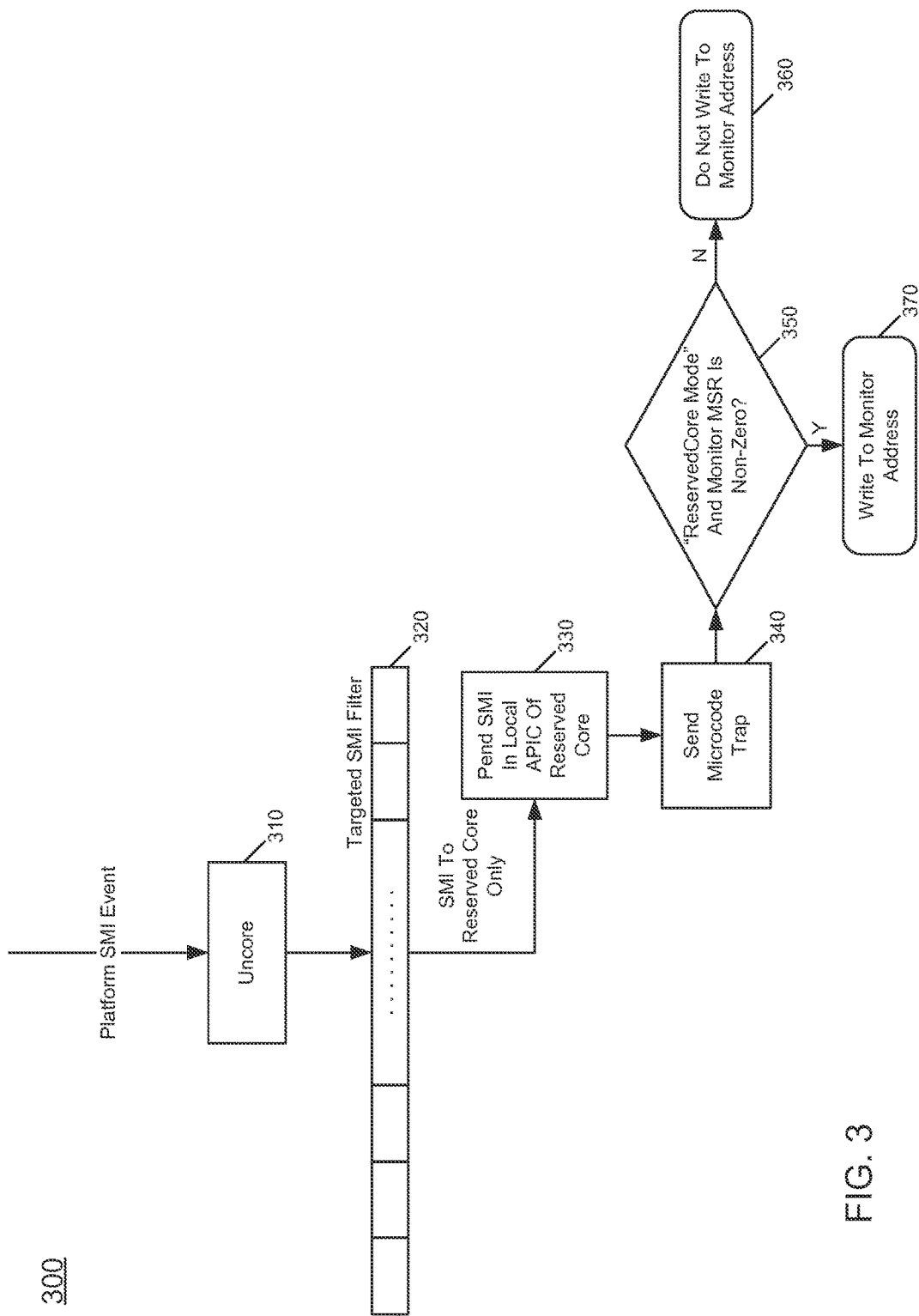
FIG. 3 is an illustration of a low power exit flow in accordance with an embodiment of the present invention.

Referring now to FIG. 3, shown is an illustration of a low power exit flow in accordance with an embodiment of the present invention. More specifically, low power flow 300 may be executed within a processor to cause a sleeping reserved core of an SMM domain to be awoken, responsive to receipt of a given SMI, such as a platform SMI event.

Thus as illustrated in FIG. 3, assume that a platform SMI event is received within an uncore 310 of the processor. In turn, uncore 310 forwards the SMI through a targeted SMI filter 320. Note further that filter 320 may be part of the uncore. Assume for purposes of discussion that this filter is configured such that all cores other than the reserved core are to be masked from receiving SMI's. As such, the output of filter 320 is an SMI signal directed only to the reserved core. More specifically, this SMI is provided to a local APIC 330 of the reserved core. This local APIC 330 pends the SMI (such that further SMIs are not delivered to the reserved core) and sends a signal to a reorder buffer (ROB) or other scheduling logic of the reserved core. In turn, the scheduling logic sends a microcode trap signal (block 340). Thereafter microcode executes on this reserved core, and which acts as a proxy to receive the SMI, since the reserved core is already in the SMM domain and thus cannot receive a new SMI event. More specifically, the microcode executes to provide a wake event to the reserved core. Here the microcode may be configured to expose a per core MSR (which may be set by BIOS on the reserved core). This MSR may thus inform the microcode that further SMIs to the reserved core may be allowed even if the core is already in SMI. As a result, responsive to execution of the MWAIT a further SMI event can be delivered to wake the reserved core to handle the SMI.

During execution of the microcode, it is determined at diamond 350 if the reserved core is in its reserved core mode, and further determines whether a value of the monitor address MSR is not zero. If this is the case, an update may be written to the monitored address as identified in the monitor address MSR read by the microcode (block 370). Responsive to this update to the monitored address, the reserved core may be awoken in order to handle the pending SMI. Otherwise, if the determination at diamond 350 is in the negative, control passes to block 360, where no update is written. As such, no exit from the low power state occurs. Understand while shown at this high level in the embodiment of FIG. 3, many variations and alternatives are possible. For example, in other cases, a non-microcode trap to wake a sleeping reserved core may be implemented. In one such case, another (non-reserved) core can be used as an assist core to wake the reserved core. In this case, the directed SMI filter may be set to point to an OS domain core (e.g., a bootstrap processor) when the reserved core is in a low power state. Then responsive to receipt of an SMI, this core receives the interrupt, writes to the MONITOR address, and then resumes its normal processing, which in turn causes the reserved core to be awoken to handle the SMI source.

A protected mode such as SMM provides a distinct operating environment that is totally transparent to the operating system. It is used, e.g., by OEMs to perform special tasks such as system management, device management, power management, thermal management and RAS functions. Embodiments may preserve and extend these features, in a way that scales with core count without degrading OS runtime performance. Note while the protected mode is described herein as a system management mode, understand that the terms "protected mode" and "system management mode" may be interchangeable and apply equally to other protected environments such as an ARM TrustZone in an ARM-based multi-core processor.

Figure 4:
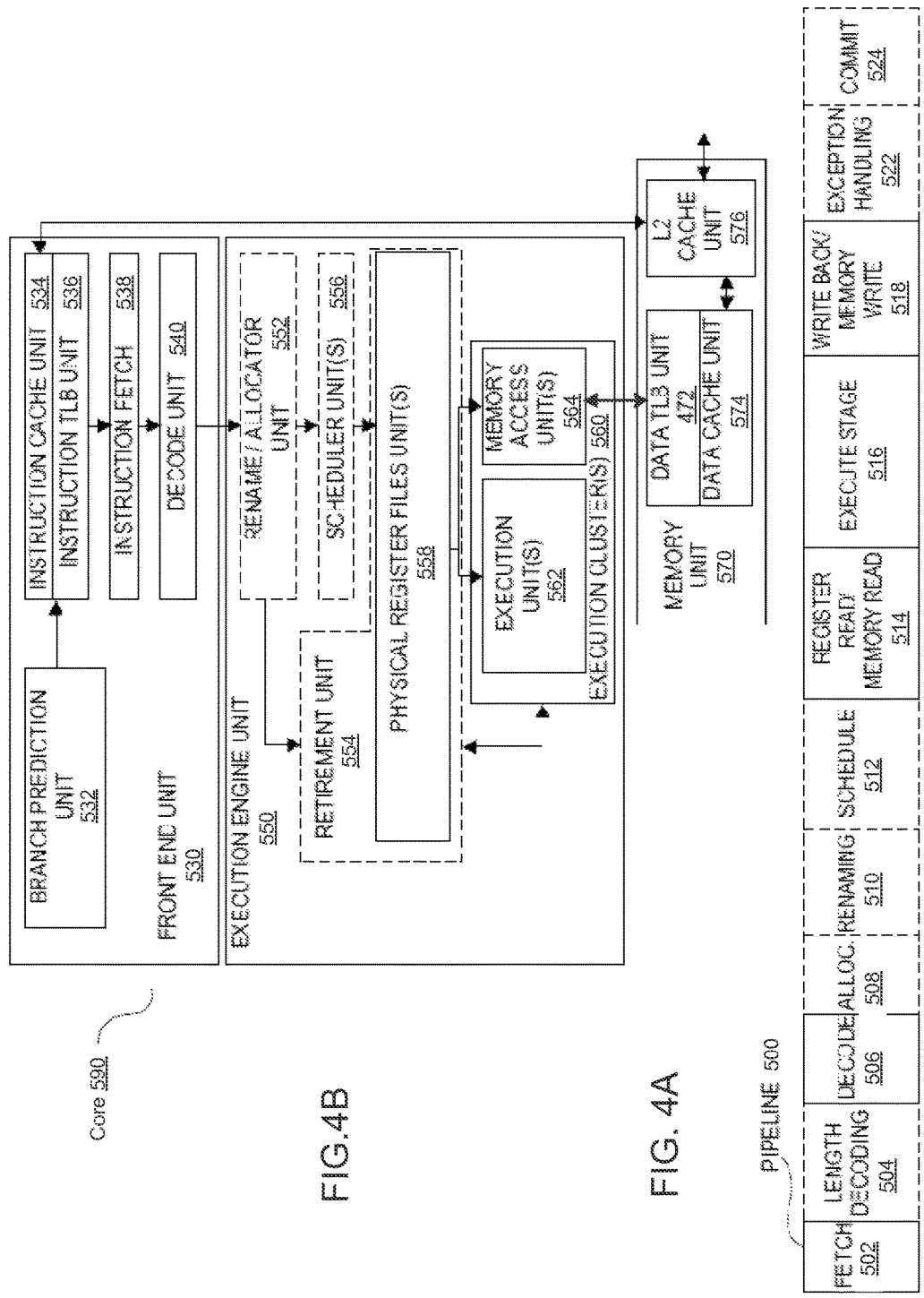
FIG. 4A is a block diagram illustrating an in-order pipeline and a register renaming stage, out-of-order issue/execution pipeline, in accordance with embodiments of the present disclosure.
FIG. 4B is a block diagram illustrating an in-order architecture core and a register renaming logic, out-of-order issue/execution logic to be included in a processor, in accordance with embodiments of the present disclosure.

Embodiments can be used in many different processor configurations. FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L 1) internal cache, or multiple levels of internal cache. In some embodiments, the system may include a combination of an internal cache and an external cache that may be external to the core and/or the processor. In other embodiments, all of the cache may be external to the core and/or the processor.

Core 490 may be included in a general-purpose processor, such as a Core™ i3, i5, i7, 2 Duo and Quad, Xeon™, Itanium™, XScale™ or StrongARM™ processor, which may be available from Intel Corporation, of Santa Clara, Calif. The processor may be provided from another company, such as ARM Holdings, Ltd, MIPS, or others. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

Figure 5:
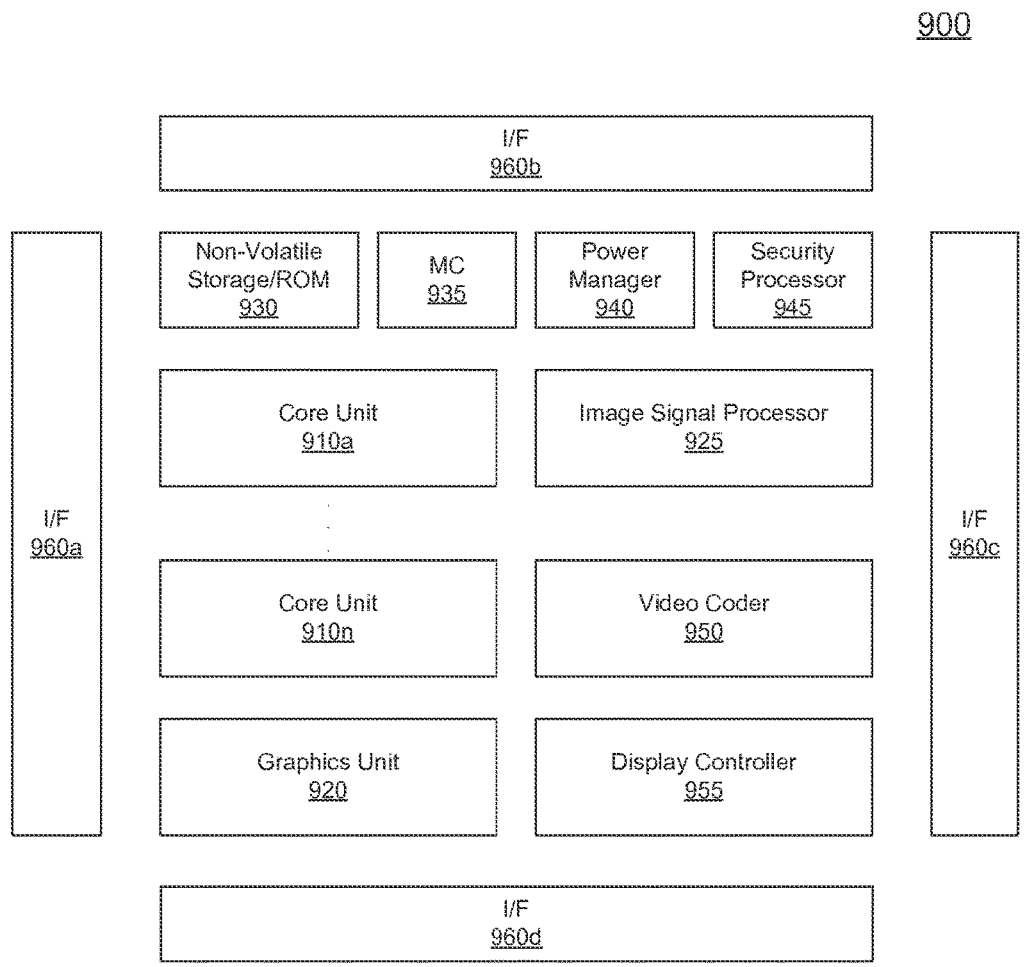
FIG. 5 is a block diagram of a processor in accordance with another embodiment of the present invention.

A processor designed to enable one or more cores to be reserved for a protected domain (and hidden from an OS) as described above may be implemented in many different end products, extending from embedded devices, Internet of Things (IoT) devices, mobile devices to server systems. Referring now to FIG. 5, shown is a block diagram of a processor in accordance with another embodiment of the present invention. In the embodiment of FIG. 5, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from AMD of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as an embedded system, smartphone, tablet computer, phablet computer, Ultrabook™ computer or other portable computing device, which may incorporate a heterogeneous system architecture having a heterogeneous system architecture-based processor design.

In the high level view shown in FIG. 5, processor 900 includes a plurality of core units 910*a*-910*n*, at least one of which may be configured as a reserved core. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth, including the autonomous self-testing test patches described herein.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 5).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 5, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 5, understand the scope of the present invention is not limited in this regard.

Figure 6:
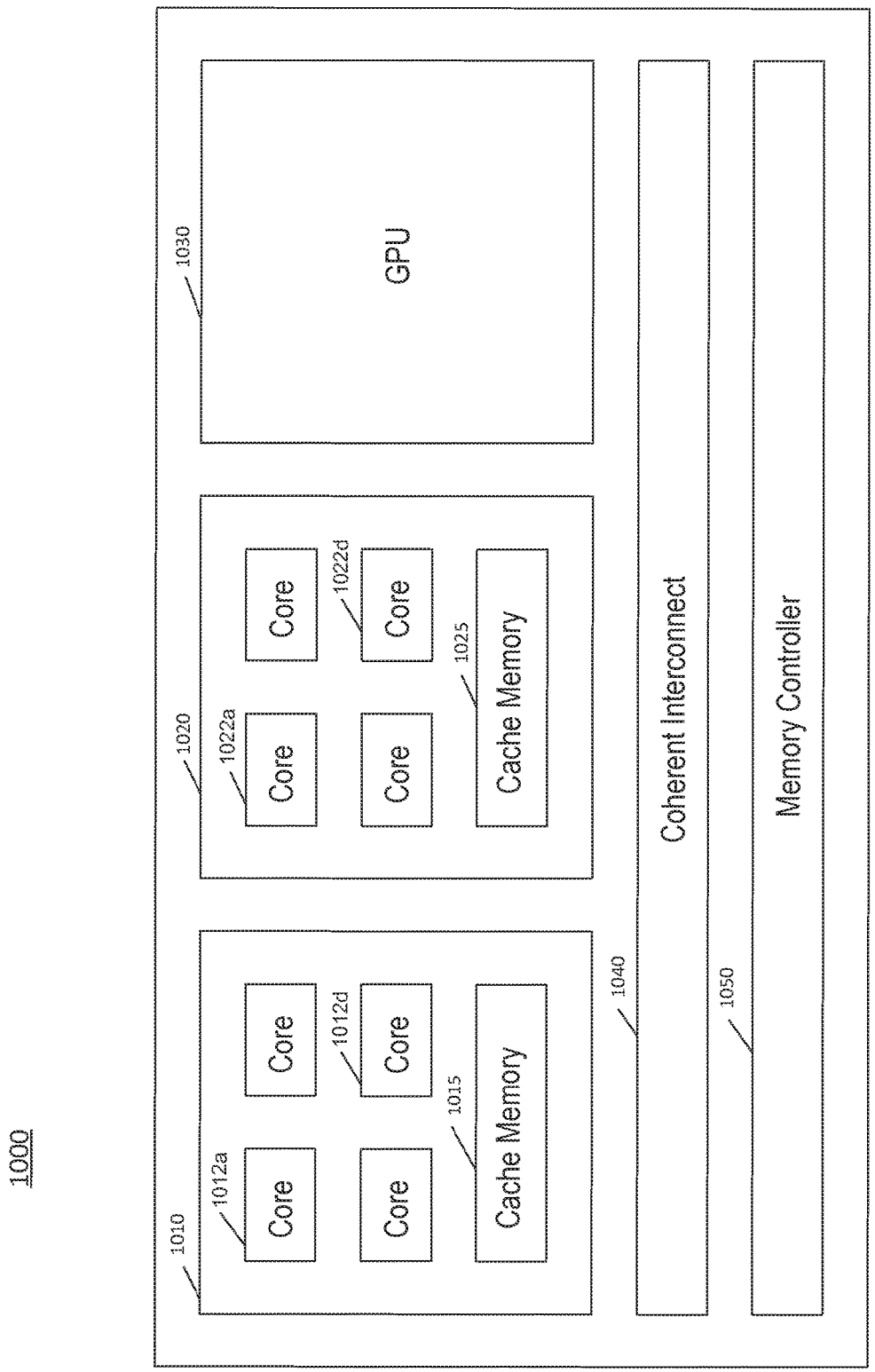
FIG. 6 is a block diagram of another example SoC in accordance with an embodiment of the present invention.

Referring now to FIG. 6, shown is a block diagram of another example SoC. In the embodiment of FIG. 6, SoC 1100 may include various circuitry to enable high performance for multimedia applications, communications and other functions. As such, SoC 1100 is suitable for incorporation into a wide variety of embedded, portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores, at least one of which may be configured as a reserved core described herein.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 6, many variations and alternatives are possible.

Figure 7:
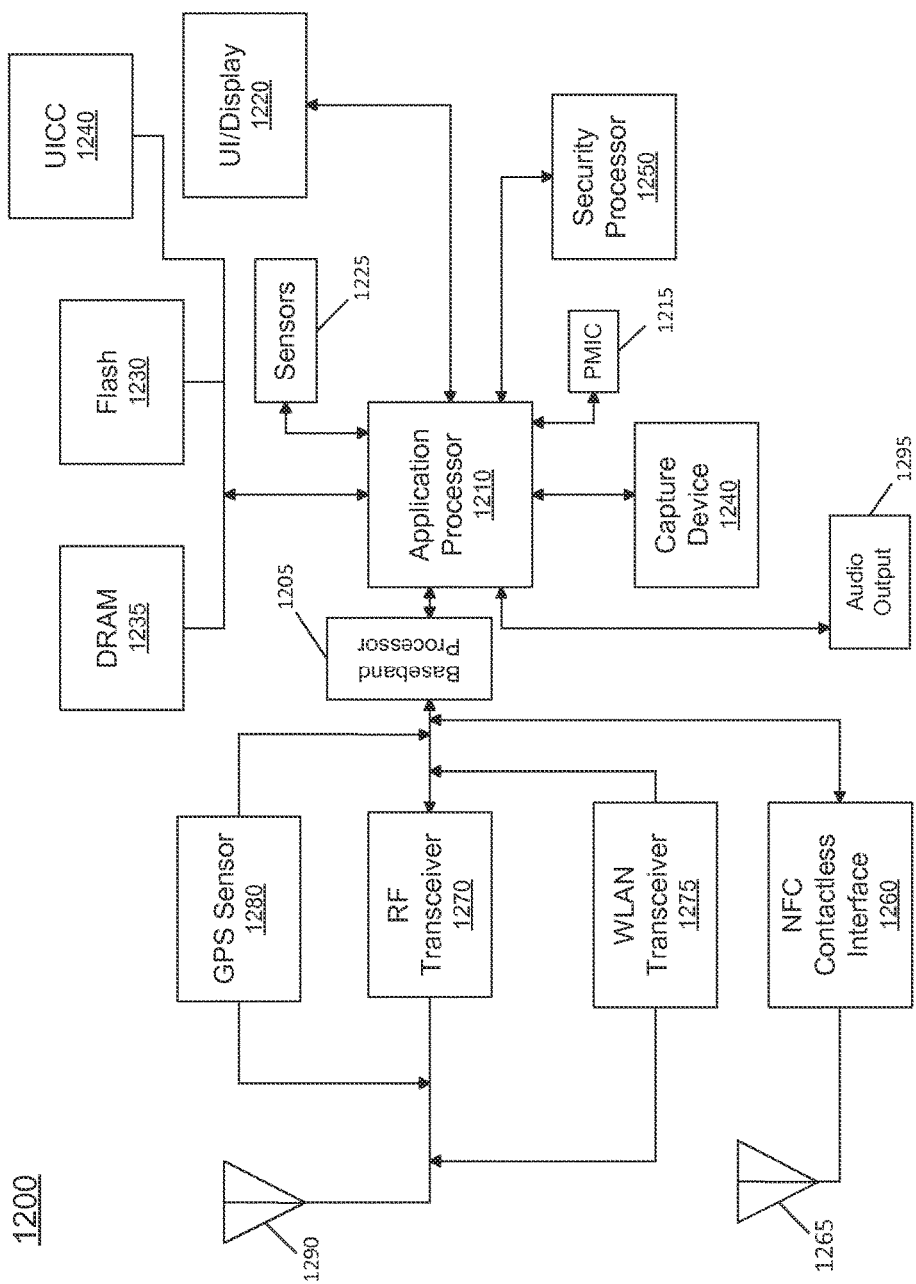
FIG. 7 is a block diagram of an example system with which embodiments can be used.

Referring now to FIG. 7, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software including SMM, to be executed on one or more reserved cores as described herein, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 7, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 7, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 8:
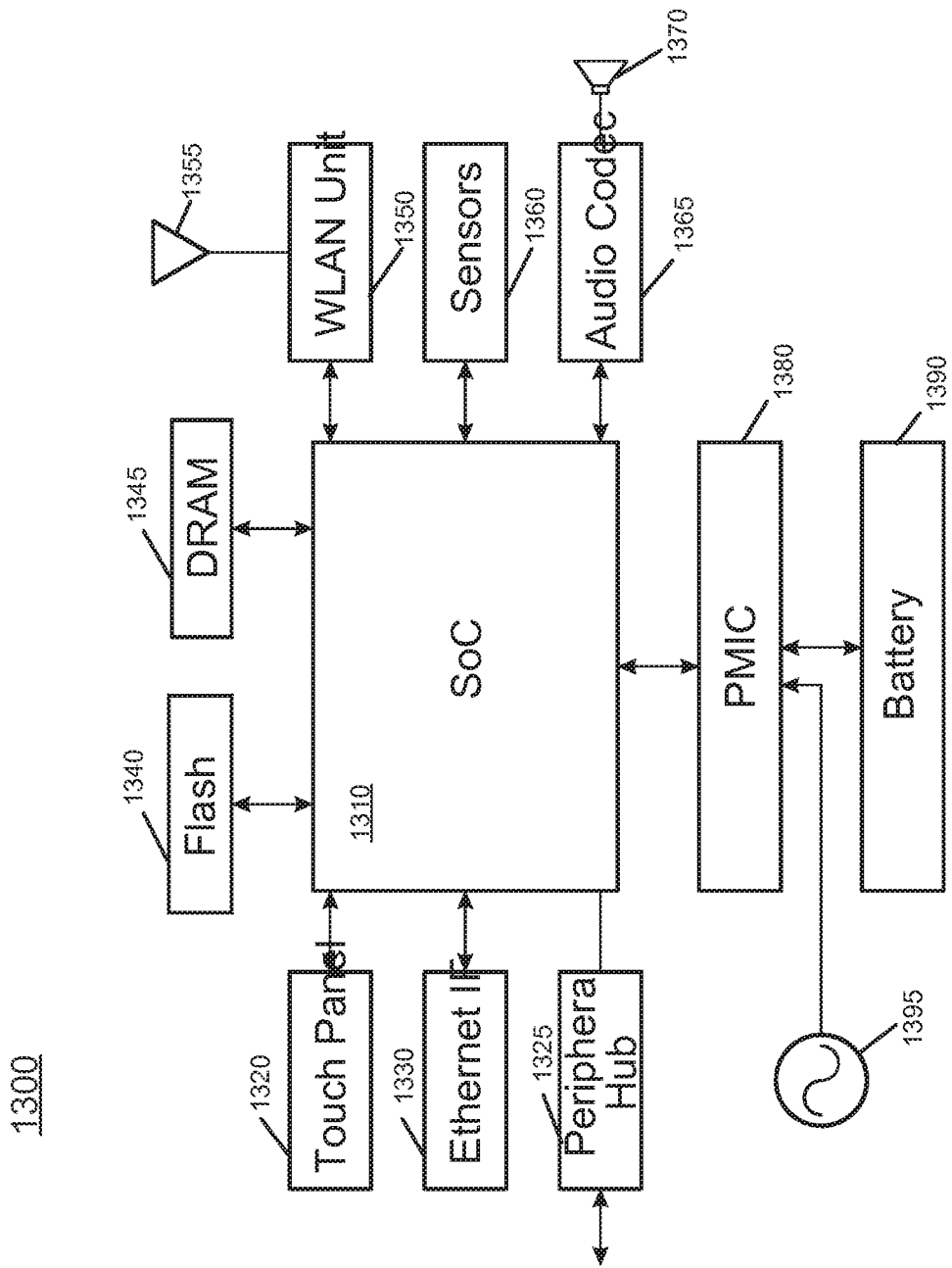
FIG. 8 is a block diagram of another example system with which embodiments may be used.

Referring now to FIG. 8, shown is a block diagram of another example system with which embodiments may be used. In the illustration of FIG. 8, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 8, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 8, many variations and alternatives are possible.

Figure 9:
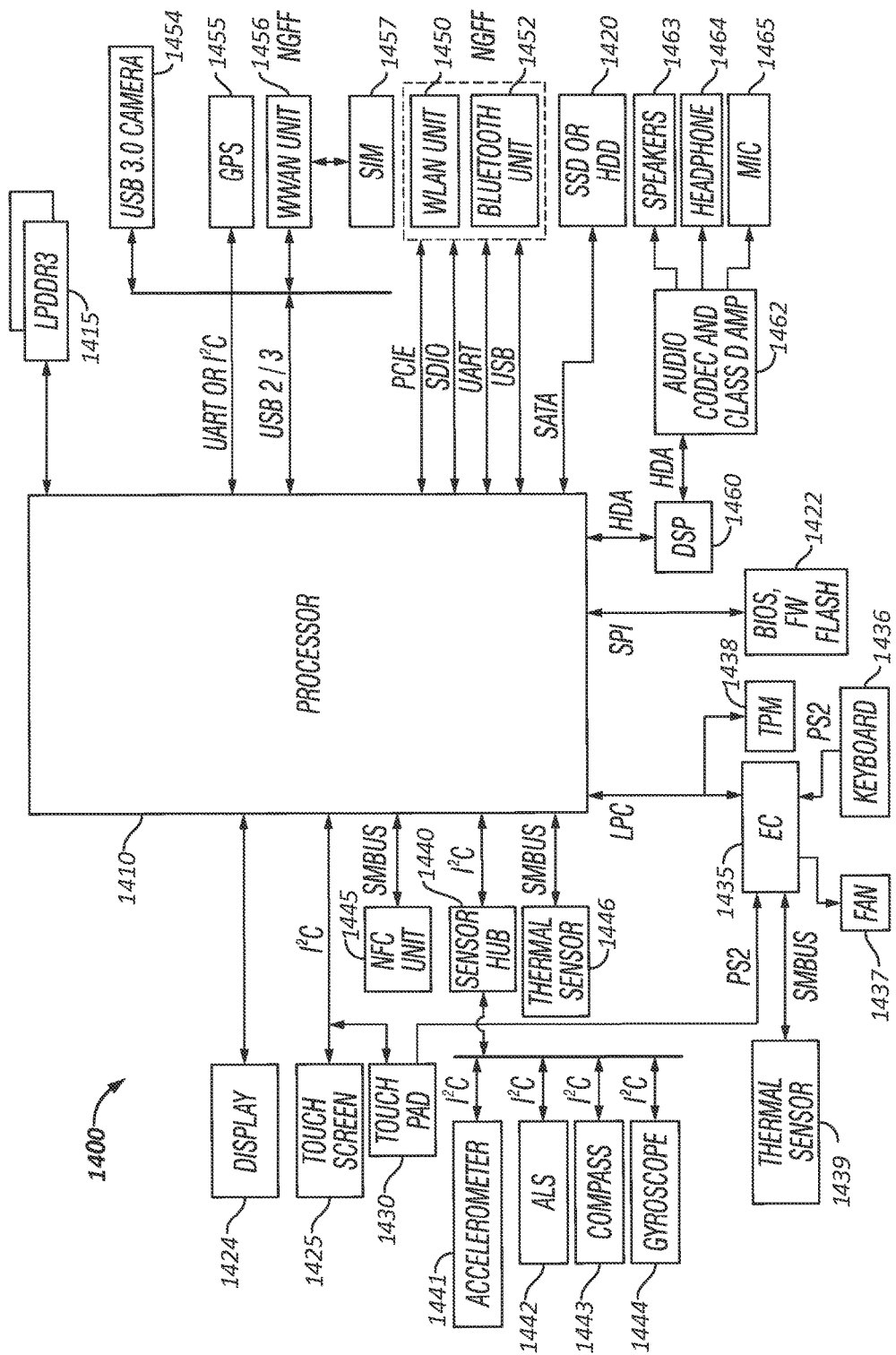
FIG. 9 is a block diagram of a representative computer system.

Referring now to FIG. 9, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC, which may include multiple cores, where at least one core may be reserved for a SMM or other protected domain, as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 9, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 9 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 9, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 9, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 9, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 9, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 9, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 9, understand the scope of the present invention is not limited in this regard.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 10:
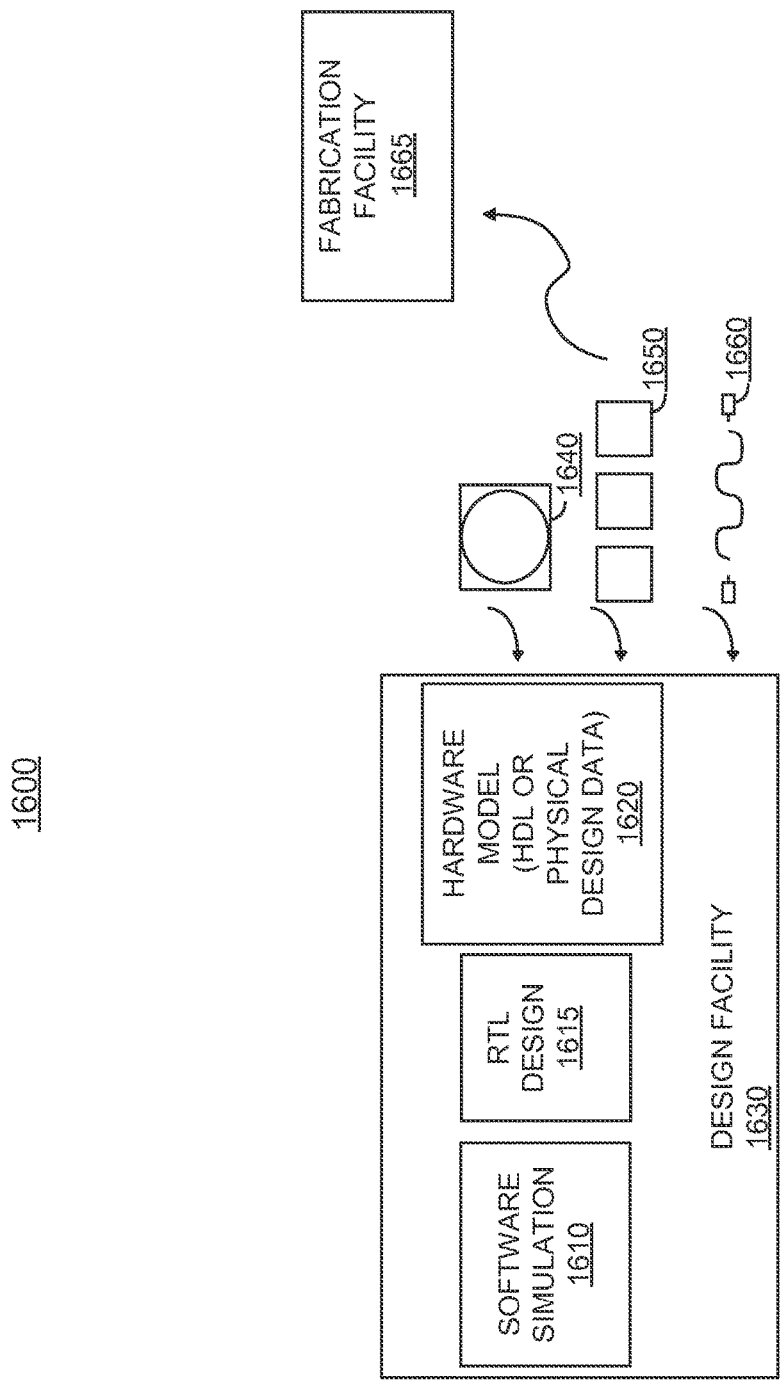
FIG. 10 is a block diagram illustrating an IP core development system used to manufacture an integrated circuit to perform operations according to an embodiment.

FIG. 10 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model 1600. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

The following examples pertain to further embodiments.

In one example, a processor comprises: a plurality of cores including a first core to be reserved for execution in a protected domain, the first core to be hidden from an OS; and a filter coupled to the plurality of cores. The filter may include a plurality of fields each associated with one of the plurality of cores to indicate whether an interrupt of the protected domain is to be directed to the corresponding core.

In an example, the first core comprises a local programmable interrupt controller to receive a first interrupt directed to the first core and to pend the first interrupt.

In an example, the local programmable interrupt controller is to receive the first interrupt from the filter, where the filter is to prevent other cores of the plurality of cores from receipt of the first interrupt.

In an example, the first core comprises a first logic, responsive to a first instruction, to identify a first location to be monitored for update, and after identification of the first location, to cause the first core to enter into a low power state.

In an example, the processor further comprises a second logic, responsive to a second instruction, to identify the update to the first location and to cause the first core to exit the low power state, where the first location is to be updated responsive to receipt of a first interrupt.

In an example, the first core is to handle the first interrupt after wakeup from the low power state, while one or more other cores of the plurality of cores execute within an operating system domain.

In an example, the first core, while in the protected domain, is to write an address of the first location into a protected storage of the processor.

In an example, the processor further comprises microcode to update the first location responsive to the first interrupt, where the microcode can read the protected storage to determine the address of the first location.

In an example, the protected storage comprises a machine specific register to be written by the first core while in the protected domain.

In an example, the first core is to poll a plurality of status registers to identify one or more incoming interrupts, and responsive to a first interrupt of the one or more incoming interrupts, to execute a handler stored in a protected portion of system memory.

In an example, the first core is to be notified of the first interrupt without receipt of an incoming interrupt signal.

In an example, the first interrupt is responsive to one or more of a reliability availability serviceability event, an error event, and a peripheral event of a peripheral device coupled to the processor.

In an example, the processor further comprises configuration logic to update a first configuration table to mark a field of the first configuration table associated with the first core as not present, to enable the first core to be hidden from the operating system.

In an example, the first core comprises a limited feature core, and each of one or more other cores of the plurality of cores comprises a full featured core.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: identifying a first core of a plurality of cores of a multicore processor to be a system management service processor; updating a configuration table to identify the first core as the system management service processor, where the configuration table update is to cause the first core to remain hidden to an operating system; and writing to a filter to mask the plurality of cores except for the first core from receiving a system management interrupt.

In an example, the method further comprises, after writing to the filter, causing the operating system to be booted.

In an example, the method further comprises identifying a least featured core of the multicore processor to be the first core.

In an example, updating the configuration table comprises updating a multiple advanced programmable interrupt controller description table to mark the first core as not present.

In an example, updating the configuration table causes the first core to be reserved in a system management mode domain for a boot cycle.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a plurality of cores including at least one first core and at least one second core, where the at least one first core comprises a reserved core to be maintained in a SMM domain for a boot cycle, the reserved core to be transparent to an OS domain. The system may further include a DRAM coupled to the processor, where the DRAM includes a SMRAM partition to be maintained in the SMM domain.

In an example, the processor further comprises a filter coupled to the plurality of cores, the filter including a first field associated with the reserved core, where when the first field is a first value, interrupts are to be delivered to the reserved core. Note that the filter may further include a plurality of second fields each associated with another one of the plurality of cores, where when the plurality of second fields are a second value, interrupts are to be prevented from being delivered to the another ones of the plurality of cores.

In an example, the reserved core comprises: a first logic, responsive to a first instruction, to identify a first location to be monitored for update, and after identification of the first location, to cause the reserved core to enter into a low power state; and a second logic, responsive to a second instruction, to identify the update to the first location and to cause the reserved core to exit the low power state, where the first location is to be updated responsive to receipt of a first interrupt.

In an example, the reserved core is to handle the first interrupt after wakeup from the low power state, while one or more other cores of the plurality of cores execute within an operating system domain, and microcode is to update the first location responsive to the receipt of the first interrupt, the microcode to read a protected storage to determine an address of the first location.

In an example, the SMRAM partition comprises a first handler, where the reserved core is to execute the first handler responsive to a SMI.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores including a first core to be reserved for execution in a protected domain for a boot cycle, the boot cycle extending until a next reset of a system including the processor, the first core to be hidden from an operating system (OS); and
   a filter coupled to the plurality of cores, the filter including a plurality of fields each associated with one of the plurality of cores to indicate whether an interrupt of the protected domain is to be directed to the corresponding core.

2. The processor of claim 1, wherein the first core comprises a local programmable interrupt controller to receive a first interrupt directed to the first core and to pend the first interrupt.

3. The processor of claim 2, wherein the local programmable interrupt controller is to receive the first interrupt from the filter, the filter to prevent other cores of the plurality of cores from receipt of the first interrupt.

4. The processor of claim 1, wherein the first core comprises a first logic, responsive to a first instruction, to identify a first location to be monitored for update, and after identification of the first location, to cause the first core to enter into a low power state.

5. The processor of claim 4, further comprising a second logic, responsive to a second instruction, to identify the update to the first location and to cause the first core to exit the low power state, wherein the first location is to be updated responsive to receipt of a first interrupt.

6. The processor of claim 5, wherein the first core is to handle the first interrupt after wakeup from the low power state, while one or more other cores of the plurality of cores execute within an operating system domain.

7. The processor of claim 5, wherein the first core, while in the protected domain, is to write an address of the first location into a protected storage of the processor.

8. The processor of claim 7, further comprising microcode to update the first location responsive to the first interrupt, the microcode to read the protected storage to determine the address of the first location.

9. The processor of claim 7, wherein the protected storage comprises a machine specific register to be written by the first core while in the protected domain.

10. The processor of claim 1, wherein the first core is to poll a plurality of status registers to identify one or more incoming interrupts, and responsive to a first interrupt of the one or more incoming interrupts, to execute a handler stored in a protected portion of system memory.

11. The processor of claim 10, wherein the first core is to be notified of the first interrupt without receipt of an incoming interrupt signal.

12. The processor of claim 10, wherein the first interrupt is responsive to one or more of a reliability availability serviceability event, an error event, and a peripheral event of a peripheral device coupled to the processor.

13. The processor of claim 1, further comprising configuration logic to update a first configuration table to mark a field of the first configuration table associated with the first core as not present, to enable the first core to be hidden from the operating system.

14. The processor of claim 1, wherein the first core comprises a limited feature core, and wherein each of one or more other cores of the plurality of cores comprises a full featured core.

15. A machine-readable medium having stored thereon instructions, which if performed by a machine cause the machine to perform a method comprising:
identifying a first core of a plurality of cores of a multi-core processor to be a system management service processor;
updating a configuration table to identify the first core as the system management service processor to cause the first core to be reserved in a system management mode domain for a boot cycle, the boot cycle extending until a next reset of a system including the multicore processor, wherein the configuration table update is to cause the first core to remain hidden to an operating system; and
writing to a filter to mask the plurality of cores except for the first core from receiving a system management interrupt.

16. The machine-readable medium of claim 15, wherein the method further comprises, after writing to the filter, causing the operating system to be booted.

17. The machine-readable medium of claim 15, wherein the method further comprises identifying a least featured core of the multicore processor to be the first core.

18. The machine-readable medium of claim 15, wherein updating the configuration table comprises updating a multiple advanced programmable interrupt controller description table to mark the first core as not present.

19. A system comprising:
a processor having a plurality of cores including at least one first core and at least one second core, wherein the at least one first core comprises a reserved core to be maintained in a system management mode (SMM) domain for a boot cycle, the boot cycle extending until a next reset of the system, the reserved core to be transparent to an operating system (OS) domain; and
a dynamic random access memory (DRAM) coupled to the processor, wherein the DRAM includes a system management random access memory (SMRAM) partition to be maintained in the SMM domain.

20. The system of claim 19, wherein the processor further comprises a filter coupled to the plurality of cores, the filter including a first field associated with the reserved core, wherein when the first field is a first value, interrupts are to be delivered to the reserved core, the filter further including a plurality of second fields each associated with another one of the plurality of cores, wherein when the plurality of second fields are a second value, interrupts are to be prevented from being delivered to the another ones of the plurality of cores.

21. The system of claim 19, wherein the reserved core comprises:
a first logic, responsive to a first instruction, to identify a first location to be monitored for update, and after identification of the first location, to cause the reserved core to enter into a low power state; and
a second logic, responsive to a second instruction, to identify the update to the first location and to cause the reserved core to exit the low power state, wherein the first location is to be updated responsive to receipt of a first interrupt.

22. The system of claim 21, wherein the reserved core is to handle the first interrupt after wakeup from the low power state, while one or more other cores of the plurality of cores execute within the OS domain, and microcode is to update the first location responsive to the receipt of the first interrupt, the microcode to read a protected storage to determine an address of the first location.

23. The system of claim 19, wherein the SMRAM partition comprises a first handler, wherein the reserved core is to execute the first handler responsive to a system management interrupt (SMI).

* * * * *